United States Patent [19]

Haskins

[11] 4,424,420

[45] Jan. 3, 1984

[54] PIVOTAL SWITCH OPERATING MECHANISM

[75] Inventor: Steve W. Haskins, Corinth, Miss.

[73] Assignee: International Telephone and Telegraph Corporation, New York, N.Y.

[21] Appl. No.: 301,462

[22] Filed: Sep. 14, 1981

[51] Int. Cl.³ .................. H01H 9/04; H01H 21/02; H04M 1/08
[52] U.S. Cl. .................. 179/164; 200/6 BB; 200/303
[58] Field of Search .................. 179/164, 159, 100 D, 179/100 C, 100 R; 200/6 BB, 6 B, 6 C, DIG. 46, 283, 303, 1 A, 1 TK

[56] References Cited

U.S. PATENT DOCUMENTS

| | | | |
|---|---|---|---|
| 2,068,713 | 1/1937 | Schellenger | 200/154 |
| 2,262,306 | 11/1941 | Thompson | 200/6 BB |
| 2,566,840 | 9/1951 | Krumreich | 179/100 D |
| 3,637,953 | 1/1972 | Rüster et al. | 179/164 |
| 3,974,347 | 8/1976 | Lockard | 200/6 R |

FOREIGN PATENT DOCUMENTS

| | | | |
|---|---|---|---|
| 1553062 | 12/1968 | France | 200/283 |
| 2420198 | 11/1979 | France | 200/6 C |
| 191893 | 1/1923 | United Kingdom | 200/6 BB |

OTHER PUBLICATIONS

"Dial and Hook Switch for Model 601 Telephone Set", by M. Murakami, Rev. of the Elec. Comm'n. Labs., vol. 26, No. 9–10, (Sep.–Oct. 1978), pp. 1312–1317.

Primary Examiner—Thomas W. Brown
Attorney, Agent, or Firm—John T. O'Halloran

[57] ABSTRACT

A pivoval switch mechanism usable as the hookswitch of a telephone instrument. The switch mechanism includes a transverse camshaft supported between actuating arms of an actuating lever. The camshaft carries a plurality of transversely spaced contact spring operating cams, each cam positioned between respective contact springs of a spring pair. The camshaft is journaled adjacent its transverse ends within bearing openings of an enclosing housing, the housing enclosing the camshaft, cams and contact springs. The contact springs are leaf springs resting in two parallel arrays of slots in the housing, the springs being identical. The spings each have an angled ridge contactor positioned to engage a ridge on a like spring member spaced therefrom.

9 Claims, 10 Drawing Figures

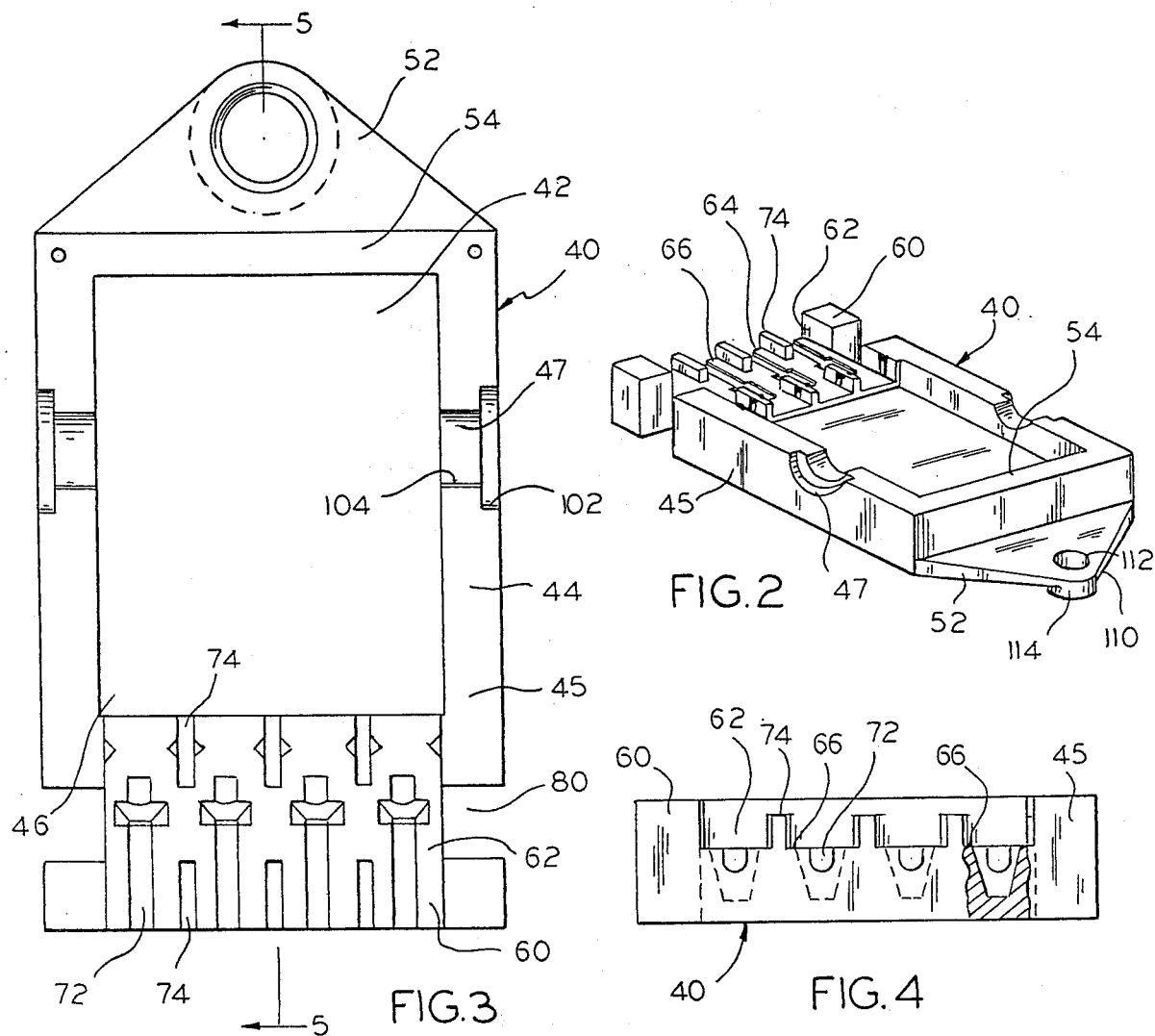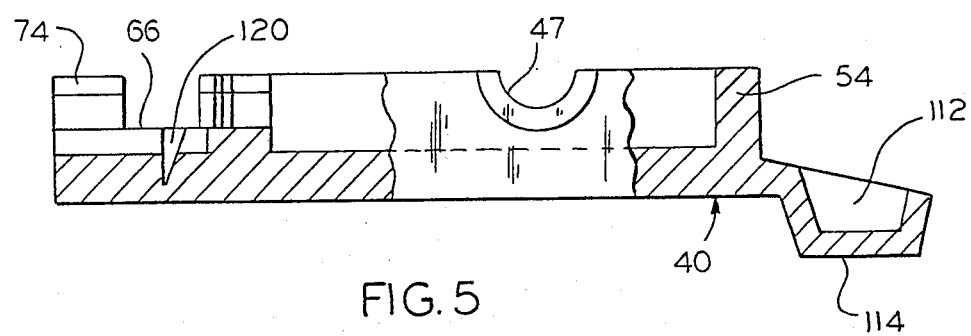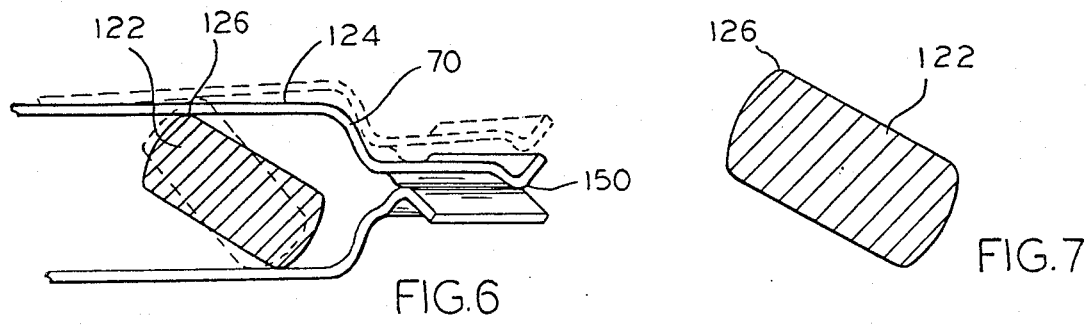

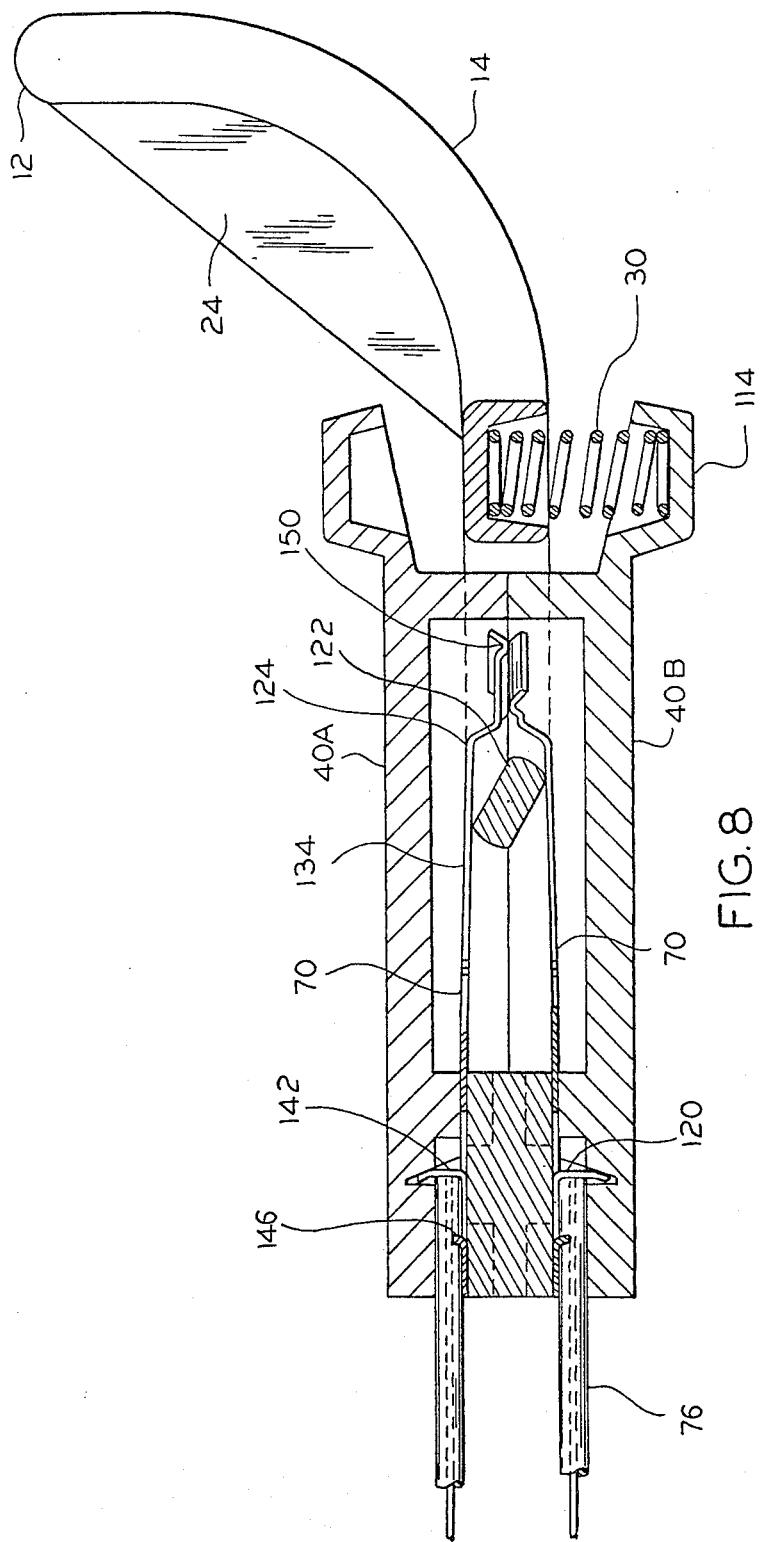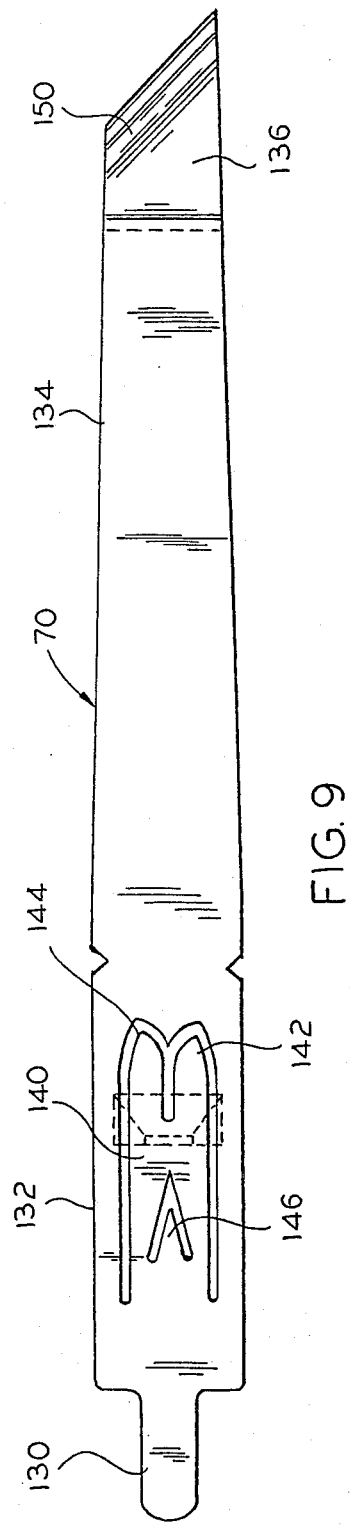

PIVOTAL SWITCH OPERATING MECHANISM

RELATED APPLICATIONS

The present application is a companion application to U.S. patent application Ser. Nos. 302,179 and 301,832, filed by me on the same date as the present application.

BACKGROUND OF THE INVENTION

Switch mechanisms usable as hookswitches for telephone instruments constitute a highly developed art with a great number of different designs in present use.

Some hookswitches are initiated by linear plungers acting on levers which frequently were bell crank levers. More recently the general tendency has been to use pivotal cradle arms. The cradle arms actuate either simple or compound lever members thereby operating leaf springs, the leaf springs being mounted within a molded base or alignment of insulators. For example, U.S. Pat. Nos. 3,916,119 issued Oct. 28, 1975 to Gumb et al. and 2,511,622 issued Jan. 13, 1950 to Curran et al. show forms of conventional hookswitch mechanisms.

SUMMARY OF THE INVENTION

The present invention is directed to a switch mechanism adapted to be operated by an actuator having pivotal actuating arms. The mechanism has as its major operating element a transverse shaft which bears a plurality of transversely spaced contact operating cams. Each cam rests between opposed leaf springs. The springs in turn have formed contact sections spaced longitudinally from the cams to make and break with the respective section of the individual opposed contact spring in a fixed sequence. The leaf springs are identical in configuration.

The camshaft, cams and springs are enclosed within a split housing formed of two identical halves. In the finished assembly, the housing halves may be suitably bonded or adhered to form a unitary dust-tight housing which can be replaced if necessary.

The housing halves are identical, one being inverted relative to the other to form the central cavity in which the contact springs are spaced apart transversely by raised housing projections. Vertically, a block spacer separates the alignments of contact springs and mates with the raised projections to clamp the spring alignments in the housing. Thus, the contact springs are held firmly in place within the housing.

The invention provides a hookswitch mechanism which can be produced inexpensively in a unitary structure comprised of a minimum of different parts. The invention employs a camshaft which is permanently sequenced to operate the contact springs, the entire operating mechanism being enclosed in a dust-resistant housing.

Further, the shape of the cams and spring contacts produce a wiping action of the contacts. The wiping action keeps the contacts free of contaminants. The contact areas each have contact surface at 45° to a transverse axis, thus the contact surfaces which engage one another cross at an angle of 90° to one another thereby forming a positive contact with one another.

BRIEF DESCRIPTION OF THE DRAWINGS

FIG. 2 is a side view in perspective of a housing shell as used herein;

FIG. 3 is a plan view of the shell of FIG. 2;

FIG. 4 is an end view in elevation of the shell of FIG. 3;

FIG. 5 is a sectional view taken along line 5—5 of FIG. 3;

FIG. 6 is a side view in elevation of a pair of contact springs and their actuating cam as used herein;

FIG. 7 is a sectional view of a typical cam as used herein;

FIG. 8 is sectional view through the center of the mechanism of FIG. 1 in its assembled state;

FIG. 9 is a plan view of a typical leaf spring of FIG. 1; and

DETAILED DESCRIPTION

Figure 1:
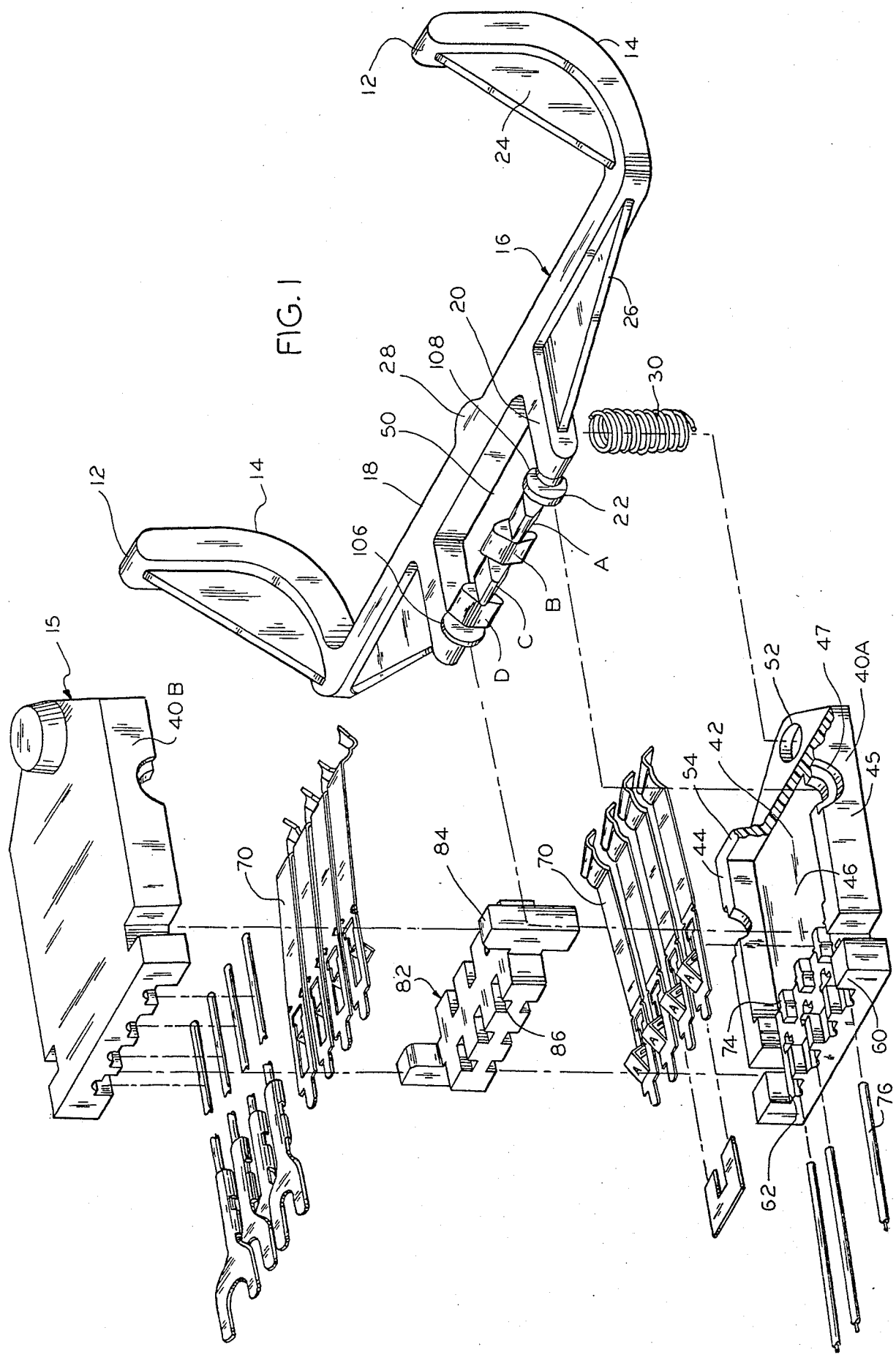
FIG. 1 is an exploded perspective view of a first embodiment of a hookswitch mechanism according to the invention.

In FIG. 1, I show a first embodiment of a switch mechanism for use as the cradle switch or hookswitch in a telephone instrument. The mechanism includes an actuating lever 16 and a housing assembly 15, the assembly including the contacts operated by the lever 16. The mechanism in one form could be positioned with the tips 12 of the parallel spaced apart actuating arms 14 of lever 16 under the plungers of the well-known 500 type telephone. The parallel actuating arms 14 form the lateral extremities of the actuating lever 16. The arms 14 are curved from the tips 12 to their connection to the cross brace 18. Extending longitudinally from the cross brace 18 are two support arms 20 for the camshaft 22.

With the actuating lever 16, there are provided suitable reinforcing webs 24 and 26 extending between members in respective planes. In addition, the cross brace 18 has a central semicircular projection 28 which preferably has a blind hole (not shown) in its underside for confining the upper end of compression spring 30.

The actuating lever 16 may be molded as a unit and the camshaft may either be molded as a part of that unit or may be mounted on a shaft fitted into suitable openings (not shown) in support arms 20.

The housing assembly 15 shown in exploded form in FIG. 1 includes a base section or shell 40 which forms half of an enclosing housing for the spring array. A base section may be molded of suitable thermoplastic material with two identical base sections designated 40A and 40B respectively joined together, one inverted relative to the other to form the enclosing housing 43 for receiving and enclosing the spring array. Each base section 40 has a generally rectangular internal cavity surface 42 with walls 44 upstanding about the periphery of the surface to form a central cavity 46 within the walls 44. To provide a perspective to the size of the switch mechanism for one commercial application, the housing could be approximately $\frac{3}{4}''$ transverse width, $1\frac{1}{4}''$ length and under $\frac{1}{2}''$ thickness.

Base section 40 has semi-circular aligned bearing openings 47 in its transverse sidewalls 45 adapted to receive the camshaft 22 in a completed assembly. With the camshaft resting in the openings 47, the sidewalls 45 are within the space between the support arms 20. The base section is generally rectangular, with a triangular extension 52 of the main surface 42 at the forward end externally of the front wall 54. As assembled with the lever 16, the extension 52 is spaced a distance from the projection 28 to capture therebetween compression spring 30.

The rear wall 60 of the base section 40 is provided with a series of spaced channel indentations 62, the number of indentations being the number of spring combinations used. Each channel indentation has an essentially horizontal main surface 64, the surfaces combinedly forming a plane 66 for resting thereon respective leaf springs 70. Each indentation 62 has centered thereunder (viewing the lower base) a central semicircular longitudinal cutout 72 for receiving a wire for connection to a leaf spring 70 resting on its surface 64 of the indentation.

Between the indentations 62 of the base section, the rear wall has upright discontinuous rib members 74 adapted to position leaf springs in the plane 66. The cutouts 72 serve to hold and align individual insulated wires 76 adjacent the respective leaf springs 70.

On the transverse sides of the base outwardly of the spring mounting area adjacent the rear thereof, both sidewalls 45 have a vertical slot 80 extending fully through the base. The two slots 80 are adapted and sized to receive mounting pillars 84 of a clamping insert 82 in a tight fitting relation. The insert 82 is used to firmly mount the springs 70 relative to a base section within the housing. The insert has longitudinal slots adapted to mate with rib members 74 to further lock the insert 82 firmly to the base.

Viewing FIG. 1, the housing 15 includes a lower base section 40B and an upper base section 40A, base section 40A being inverted relative to base section 40B. Insert 82 fits between these base sections with the pillars 84 of the insert resting in slots 80 in both sections. As mentioned, insert 82 has a spring mounting section and at its transverse sides vertical pillars 84 for mating with the slots 80 and fit the insert in the base sections to hold the leaf spring contacts in place between both base sections 40A and 40B. The insert 82 has longitudinal recesses 86 in both its upper and lower surfaces which mate with the base spacing members 74 to rigidly hold the insert in place in all directions and to secure the upper and lower base sections together with the leaf springs captive between the insert and the respective base sections.

In the structure of FIG. 1, the actuator lever 16 is moved by a switch operator or by plungers (not shown) to rotate the actuator lever with or on the axis of the camshaft 22. On the camshaft, there are a plurality of laterally spaced cams, each such cam positioned between vertically spaced (as in FIG. 1) leaf springs. Rotation of the camshaft rotates the cams with their highs and lows to either make or break the leaf spring contacts in a desired sequence, as indicated by the cam settings and lobe positioning.

FIGS. 2-5 show a typical base section 40 in greater detail. In these figures, the general rectangular shape of the base is apparent with its walls 44 forming a raised periphery for the central cavity. The aligned bearing openings 47 formed in the sidewalls 45 are configured of an enlarged diameter external portion 102 and a smaller diameter inner portion 104 both concentric with the bearing opening. The camshaft 22 is configured to mate with the opening 47 (See FIG. 1) with an outer enlarged diameter portion 106 rotating within portion 102 to shield and effectively seal the inner, lesser diameter bearing 108. Bearing 108 mates with portion 104 to combinedly provide a bearing area within a dust seal which seals the housing cavity from dust and other contaminants.

As seen best in FIGS. 2 and 3, the triangular extension 52 of the housing main surface 42 has a tapering cross section narrowing in thickness in the direction of the apex 110 of the extension 28. The extension 28 has a blind bore 112 closed at its outer end within a circular boss 114 seen best in FIGS. 2, 3 and 5. The blind bore 112 provides a bearing surface for one end of compression spring 30 to restore and maintain the hookswitch in its normal unactuated conditions.

At its rear, the housing has channel indentations 62 separated by spacer rib members 74, each channel indentation having a semi-circular longitudinal cutout 72 incised in it. Each cutout 72 has midway along its longitudinal extent a tapering vertical (FIGS. 4 and 5) socket 120 for receiving a portion of the spring contact to engage and hold an insulated wire in contact with the contact spring, as will be explained.

In FIG. 6, I show a typical cam 122 of camshaft 22 resting between opposed contact springs in its unoperated or closed state, the cam 122 being shown alone in FIG. 7. In FIG. 6, I also show in dashed line form aligned with cam 122 a second cam 124 shown in a position having operated its contacts 124 to an open condition. Each cam has two curved lobes, such as lobe 126, which are asymmetrically disposed to introduce over travel for wiping action to clear the contacts of possible contaminants. The cams may be molded as part of a one-piece camshaft preferably of material such as reinforced nylon or suitable polyester. The angular position of the cams may be staggered to provide a desired sequence of operations.

The leaf spring contacts 70 are shown in detail in FIGS. 1, 6, 8 and 9. The springs 70 are all identical, there being shown eight springs aligned in four pairs within an assembled mechanism. The spring pairs are spaced transversely as shown in FIG. 1 with each pair having a cam positioned between the springs of the pair to control the operation of the pair on rotation of the cam. Each spring extends from a tang end 130 through a wire connection portion 132 and a cam engaging portion 134 to the contact end 136.

The tang end 130 in the completed assembly extends past the rear wall 60 of the housing to enable plug-in mounting of the housing assembly into a circuit board or other suitable receiving terminal structure (not shown) as an alternative to the connection of conductor wires to the contact springs, as shown. The tang end 130 has reduced transverse width to enable this plug-in capability.

The wire connection portion 132 includes a pierced portion formed with a central raised knee 140 angled from the spring body with a descending bifurcated tip 142 at the free end of the pierced material. The bifurcation of tip 142 produces a pair of transversely spaced prongs 144 extending beneath the body or main portion 134 of the spring. A triangular pierced depression 146 is fabricated into the rising wall of the knee for a purpose which will be explained further herein. Portion 134 is a flat intermediate portion of the leaf spring which rests in the central cavity of the housing, when assembled (See FIG. 8).

The contact end of the spring includes a raised, formed contacting surface 150 at an angle of approximately 45° to the length of the spring. The formed surface is raised from a step 152 at the forward end of the spring, the step 152 being raised from the body portion 134 of the spring. The surface 150 may be suitably plated with contact metal.

Figure 10:
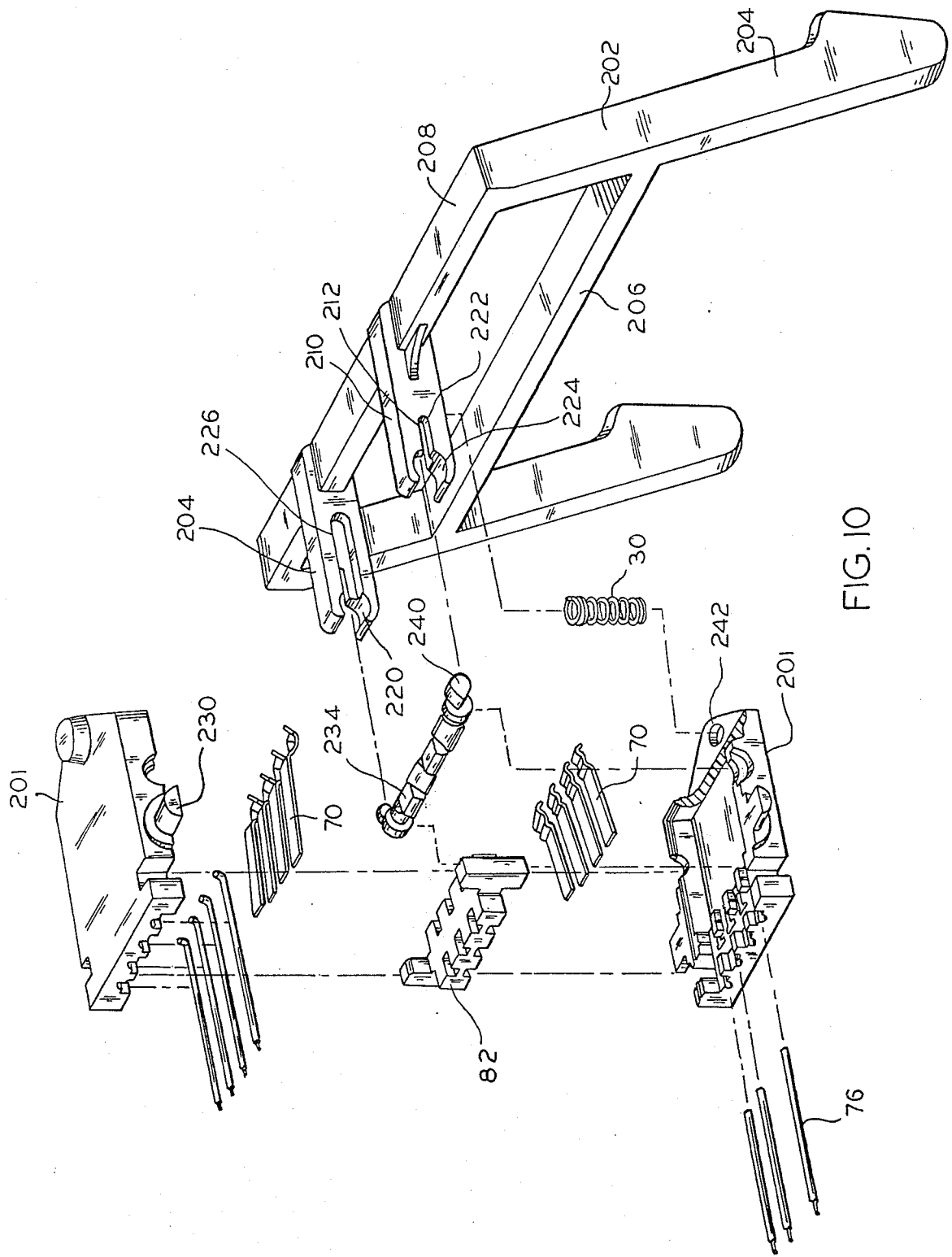
FIG. 10 is an exploded perspective view of a second embodiment of a hookswitch employing my invention.

The clamping insert 82 is shown in FIGS. 1 and 10 and has a main transverse body with vertical pillars 84 centered at the transverse sides thereof. The pillars are rectangular in cross-section and extend above and below the main body 88. The body has plural parallel slots or recesses 86 in its top and bottom surfaces extending partially longitudinally, there being slots 86 in both the front and rear and in the top and bottom of the body. The insert is symmetrical so that it mates with both the upper base section 40A and lower base section 40B and its forward and rear ends are identical so that it may be assembled without regard to specific positioning as forward or rear, up or down. The slots 86 in the insert body 88 are adapted to mate with the rib members 74 of the base to readily position and align the insert to the base.

The embodiment of FIG. 10 is generally similar to that previously described with changes in the shape of the actuator lever, the camshaft and the addition of pivot stubs 216 on the housing 201 for mating with the actuator lever.

The actuator lever 202 of FIG. 10 is a one piece molded plastic member with parallel spaced apart arms 204 and transverse cross bracing members 206 and 208. The actuator lever has spaced apart housing mounting arms 210, the arms having parallel slots 212 in their ends. The slots are configured with a transverse outer section and an inner section. The outer section has a generally circular terminus 220 open at one end leading at the inner end to a comparatively narrow blind slot 222. The inner section has an outer area 224 coextensive with the circular terminus 220 leading to a slot 226 of larger height than slot 222 while extending further into the arm than slot 222.

To mate with the slots, the housing 201 of FIG. 10 has segmental pivot stubs 230. When bases are paired to constitute a housing, the segmental stubs are aligned to form a cylindrical shaft which fits within the both circular slots sections 220 and 224 of the actuator lever and form a pivot for the actuator relative to the housing.

The camshaft 234 of FIG. 10 has transverse outer eccentric cam throws 240 at each end which are designed to slide into the inner slots ends 226 of the actuator lever. These eccentric cam throws 240 in conjunction with the lever produce approximately 12° of lever movement causing as much as 48° of cam rotation in addition to the rotation caused by the angular movement of the actuator lever. In this embodiment the camshaft does not act as the pivot axis for the actuator lever, but instead the stub pivot shaft 230 spaced from the camshaft forms the pivot axis. The spacing of the camshaft from the pivot axis provides a lever arm distance for movement of the camshaft which is further enhanced by the eccentric cam throws riding within the actuator lever slots.

As can be understood from FIG. 1, the housing and actuator lever are assembled into a unitary assembly. The assembly would be undertaken by placing one base such as base section 40B of FIG. 1 in a cavity up position on a flat surface. Insulated wires 76 are then laid into the cutouts 72 extending to the end of the cutouts as seen in FIG. 3. Four such wires would be used, one for each indentation 62 and its corresponding cutout 72. Leaf springs 70 are inserted next. Four leaf springs would be placed in the indentations, one spring per indentation with the spring knee facing upwardly and the prongs 144 facing downward. As a spring is inserted, its bifurcated tip 142 is placed within the entrance to a tapered vertical socket 129 as seen in FIG. 5. The wire-connection portion 132 of each spring rests in its respective indentation 62 in the rear wall 60 of the base with the spring contact ends resting in the base cavity.

The plastic insert 82 is then moved to the position shown in FIG. 1 above the spring connection area of the lower base section 40B and pillars 84 are fitted within the side slots 80 of the housing base. The insert is then lowered in place. The insert 82 is depressed onto the springs and tends to force the bifurcated tips 142 into their respective vertical sockets 120 to pierce the insulation on the conductors wires 76 and conductively connect the springs to the respective conductor wires. The insert is forced downwardly until pierced section 146 also pierces the insulation and adds a secondary or back-up and strain relief connection between spring and wire.

The next step in the assembly is the installation of the compression spring anc camshaft to the assembly. The compression spring 30 is fitted in the blind opening 112 of the base section 40B. The transverse ends of the camshaft 22 are placed into the housing bearing openings 47. The cams of the camshaft rest above the respective spring body sections 134.

The upper set of leaf springs 70 are then placed on the insert 82. The cam engaging portions 134 rest on the cams with the bifurcated tips 142 of the springs pointing upwardly. The knee sections 140 rest in the rear recesses 86 of the insert with the bodies of the springs resting on the insert and extending into the cavity to rest on the cams. The upper conductor wires are positioned in the upper housing cutouts of the upper base section 40A and the upper base section is lowered onto the insert pillars 84 and onto the leaf springs resting on the insert. The pressure exerted by the upper base section 40A as it descends acts to seat the wires into the bifurcated tips 142 to pierce the wire insulation and connect each wire to a leaf spring. The housings may thereafter be suitably adhered together by adhesive or heat or the like.

As viewed in FIG. 1, cams A and C maintain two spring contacts in the closed position shown by FIG. 8 and two cams B and D hold their contacts in the open position. By setting each cam in its own respective angular orientation relative to a radial plane through the axis of the camshaft, sequencing of the spring operations can be obtained.

As the mechanism would be used, the base could be held stationarily within a mounting with the camshaft essentially horizontal and front end of the housing elevated. The actuating lever is pivotally supported on the camshaft in the embodiment of FIGS. 1–9. The actuating arms 14 are depressed by the action of a plunger or cradle switch or handset itself to pivot, overcoming the bias imposed by spring 30. As the lever pivots, the camshaft rotates within the housing journal openings.

As the camshaft rotates, the cams make or break the contacts of the spring pairs. Thus, in FIG. 1, cams A and C would open their contact sets while cams B and C would allow their contact sets to close. The sequence of operation of contact sets would be determined by the angular orientation of the cams relative to a base plane through the camshaft axis. On release of the actuating force on the lever, the bias of spring 30 restores the lever to its original condition restoring the contact springs to their original condition.

In the embodiment of FIG. 10, pivotal movement or rotation of the actuating lever is about the stub shaft axis and rotates the camshaft. The camshaft further rotates relative to the lever due to the eccentric end cam throws to move the camshaft through an added arc causing enhanced wiping action on the contacts and allowing greater contact pressures to be generated.

What is claimed is:

1. A hookswitch mechanism for a telephone instrument comprising:
   a camshaft rotatable through an arc upon movement of an operating means;
   at least one pair of leaf springs;
   at least one cam mounted on said camshaft disposed between and adjacent a contact end of each of said leaf springs of said one pair of leaf springs, said contact ends of said one pair of leaf springs being spaced apart by said one cam in a first position of said camshaft and said contact ends of said one pair of leaf springs being in electrical contact with each other in a second position of said camshaft;
   each of said leaf springs including a crested ridge formed therein at an acute angle to a base line parallel to the length of said leaf springs to provide a contacting surface at said contact end thereof, said contacting surfaces of said pair of leaf springs forming a cross shaped contact in said second position of said camshaft; and
   a housing including a first portion having at least one first recess to receive therein one of said leaf springs of said one pair of leaf springs, a second portion having at least one second recess facing said first recess to receive therein the other of said leaf springs of said one pair of leaf springs, said first and second portions when joined together forming registered openings therein to receive opposite ends of said camshaft, and an insert disposed between said one of said one pair of leaf springs and said other of said one pair of leaf springs, said insert having at least a third recess engaging a cooperating projection adjacent said firt recess, at least a fourth recess engaging a cooperative projection adjacent said second recess and a pair of projections each disposed at opposite ends of said insert to engage cooperating notches in each of said first and second portions, said insert cooperating to interconnect said first and second portions and to retain said one pair of leaf springs in position in said first and second portions.

2. A hookswitch mechanism according to claim 1, wherein
   said leaf springs of said one pair of leaf springs are identical, with said one of said one pair of leaf springs being inverted relative to said other of said one pair of leaf springs to provide said cross shaped contact, and
   each of said leaf springs of said one pair of leaf springs includes a step between said contact end and an adjacent cam engaging section thereof.

3. A hookswitch mechanism according to claim 2, wherein
   said camshaft has eccentric journals at the ends thereof mating with said operating means for producing enhanced rotation of said camshaft.

4. A hookswitch mechanism according to claim 2, wherein
   there are a plurality of pairs of such said leaf springs and pluralities of said first and second recesses, one leaf spring of each pair of said plurality of pairs of leaf springs being disposed in a different one of said plurality of said first recesses and the other leaf spring of each of said plurality of pairs of leaf springs being disposed in a different one of said plurality of said second recesses, said insert having a plurality of such third recesses, each of said third recesses engaging cooperating projections adjacent respective ones of said plurality of said first recesses, and a plurality of such fourth recesses, each of said fourth recesses engaging cooperating projections adjacent respective ones of said plurality of said second recesses, and
   there are a plurality of such cams disposed on said camshaft, each of said plurality of cams being disposed between different pairs of said leaf springs, each of said cams including a plurality of lobes angularly staggered to provide sequencing of contact closures of said plurality of pairs of leaf springs.

5. A hookswitch mechanism according to claim 4, wherein
   said camshaft has eccentric journals at the ends thereof mating with said operating means for producing enhanced rotation of said camshaft.

6. A hookswitch mechanism according to claim 1, wherein
   said camshaft has eccentric journals at the ends thereof mating with said operating means for producing enhanced rotation of said camshaft.

7. A hookswitch mechanism according to claim 1, wherein
   said operating means pivots about said camshaft relative to said housing.

8. A hookswitch mechanism according to claim 1, wherein
   said housing further includes pivot stubs disposed on the outside thereof, and
   said operating means pivots about said pivot stubs relative to said housing.

9. A hookswitch mechanism for a telephone instrument comprising:
   a camshaft rotatable through an arc upon movement of an operating means;
   at least one pair of leaf springs; and
   at least one cam mounted on said camshaft disposed between and adjacent a contact end of each of said leaf springs of said one pair of leaf springs, said contact ends of said one pair of leaf springs being spaced apart by said one cam in a first position of said camshaft and said contact ends of said one pair of leaf springs being in electrical contact with each other in a second position of said camshaft;
   each of said leaf springs including a crested ridge formed thereon at an acute angle to a base line parallel to the length of said leaf springs to provide a contacting surface at said contact end thereof, said contacting surfaces of said pair of leaf springs forming a cross shaped contact in said second position of said camshaft; and
   said camshaft having eccentric journals at the ends thereof meeting with said operating means for producing enhanced rotation of said camshaft.

* * * * *